E. WITZENMANN.
COCK COUPLING.
APPLICATION FILED APR. 11, 1907.
902,192.
Patented Oct. 27, 1908.
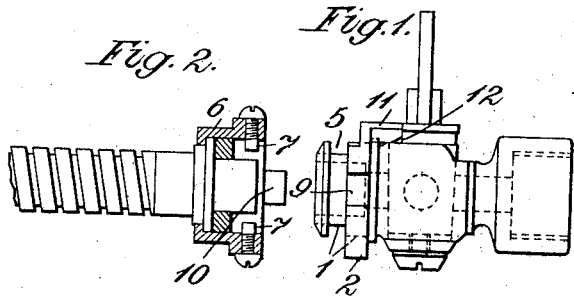
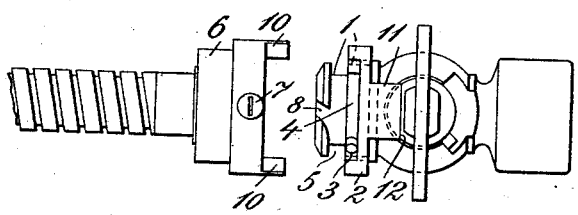
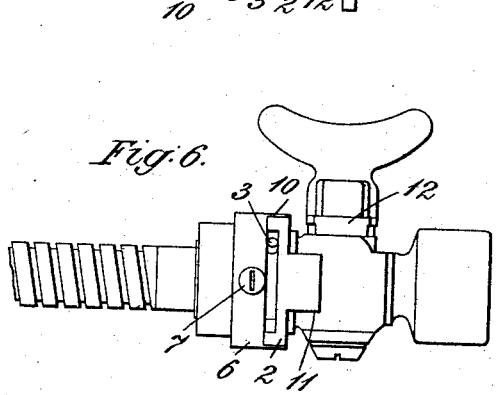
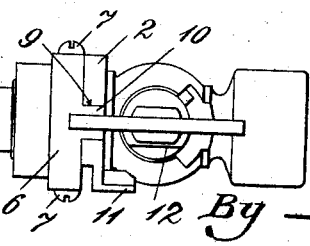

UNITED STATES PATENT OFFICE.

EMIL WITZENMANN, OF PFORZHEIM, GERMANY.

COCK-COUPLING.

No. 902,192. Specification of Letters Patent. Patented Oct. 27, 1908.

Application filed April 11, 1907. Serial No. 367,494.

*To all whom it may concern:*

Be it known that I, EMIL WITZENMANN, manufacturer, a subject of the Grand-Duke of Baden, residing at Pforzheim, German Empire, No. 48 Holzgartenstrasse, have invented new and useful Improvements in Cock-Couplings, of which the following is a specification.

The subject of my invention is an improved device for coupling a pipe to a cock. The essential feature of the invention is that on disconnecting the pipe from the cock the latter is locked automatically in the closed position, so that it can not be opened again until the locking device has been actuated; while, on the other hand, on connecting the pipe to the cock the latter is automatically unlocked, so that it can be opened and closed as desired.

One form of construction of the invention is illustrated in the accompanying drawing, in which Figure 1 is a side elevation of the cock in the moment of a hose pipe being uncoupled. Fig. 2 is a side elevation and part section of the hose pipe end, the position of the parts corresponding with Fig. 1. Fig. 3 is an end elevation of Fig. 1. Fig. 4 is a plan of Fig. 1, and Fig. 5 is a plan of Fig. 2. Fig. 6 is an elevation of the cock with hose coupled thereto, the plug being shown in the open position. Fig. 7 is a plan of Fig. 6.

On the nozzle 1 of the cock there is provided a rotary collar 2, which is held in place by a pin 3 on the nozzle fitting into a recess 4 in the collar. The nozzle is also furnished with a groove 5, and the coupling piece 6 of the hose has pins 7, which in conjunction with notches 8, entering the groove 5, constitute a bayonet-joint for coupling hose and cock.

The collar 2 is provided with notches 9 corresponding with horns 10 on the coupling piece of the hose. The collar is further furnished with a lug 11, which in a certain position of the collar abuts against a plane surface 12 of the cock plug and locks the cock in this position.

The face 12 is so located that when the lug 11 abuts against it, the plug is in the closed position.

If the hose is, for instance, to be detached from the cock, the collar 2 must first be brought into the position shown in Fig. 1, as the horns 10 of the ring 6 which forms the bayonet-joint engage in the notches 9 of the collar 2 and turn the latter on rotation of the coupling piece of the hose. In order, however, to be able to bring the collar 2 with lug 11 into the position shown in Figs. 1 and 4, the plug must be first so turned as to bring its face 12 into the position shown in these figures, and in this position the cock is closed. Thus after removal of the hose the cock can only be opened if the collar 2 with its lug 11 is turned from the position shown in Fig. 1 into that shown in Fig. 6; there is thus double security afforded for the cock.

When the hose is applied to the cock the latter is automatically unlocked by the rotation of the collar 2 and can then be opened at once.

Having thus described my invention, what I claim as new and desire to secure by Letters Patent is:

1. In a cock coupling, a pipe having a coupling piece, a cock having a plug with a plane surface, a collar rotatably mounted on the nozzle of the cock, means for limiting the rotation of said collar, and means on the collar for engaging said plane surface to lock the plug in its closed position.

2. In a cock coupling, a pipe having a coupling piece, a cock having a plug with a plane surface, a collar rotatably mounted on the nozzle of the cock, means for limiting the rotation of said collar, means on the collar for engaging said plane surface to lock the plug in its closed position, and means on said coupling piece to engage notches in said collar.

3. In combination, a pipe having a coupling-piece presenting two horns; a cock having a plug, and a nozzle making a bayonet-joint with the pipe coupling-piece, and presenting a pin; and a collar rotating on the nozzle and having a recess to receive said pin and notches to receive said horns and a lug adapted to engage with a face of the plug and lock the latter in closed position when the bayonet-joint is open and the horns lie in their notches; substantially as described.

4. In a cock coupling, a pipe having a coupling piece, a cock having a plug with a plane surface, a collar rotatably mounted on the nozzle of the cock, means for limiting the rotation of said collar, means on the collar for engaging said plane surface to lock the plug in its closed position, means on said coupling piece to engage notches in said collar, and means on the collar for engagment with the nozzle to form a bayonet-joint therewith.

In witness whereof I have hereunto signed my name this 20th day of March 1907, in the presence of two subscribing witnesses.

EMIL WITZENMANN.

Witnesses:
ERNEST ENTERNNAM,
HENRY H. MORGAN.